(12) United States Patent
Giebel et al.

(10) Patent No.: US 7,905,414 B2
(45) Date of Patent: Mar. 15, 2011

(54) IMAGING READER WITH ADAPTIVE FOCUSING FOR ELECTRO-OPTICALLY READING SYMBOLS

(75) Inventors: James Giebel, Centerport, NY (US); David P. Goren, Smithtown, NY (US); Bradley Carlson, Huntington, NY (US); Christopher Warren Brock, Manorville, NY (US); William Sackett, Rocky Point, NY (US); Edward Barkan, Miller Place, NY (US); Vladimir Gurevich, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 417 days.

(21) Appl. No.: 12/005,579

(22) Filed: Dec. 27, 2007

(65) Prior Publication Data

US 2009/0166426 A1 Jul. 2, 2009

(51) Int. Cl.
G06K 7/10 (2006.01)
G06K 9/22 (2006.01)

(52) U.S. Cl. ............... 235/462.45; 235/472.01; 235/455

(58) Field of Classification Search ............. 235/462.25, 235/462.24, 462.41, 462.11, 454, 472.01, 235/455
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,304,786 A | 4/1994 | Pavlidis et al. | |
| 5,305,731 A | 4/1994 | Buchholtz | |
| 5,625,496 A | 4/1997 | Akiyama et al. | |
| 5,703,349 A | 12/1997 | Meyerson et al. | |
| 6,369,954 B1 | 4/2002 | Berge et al. | |
| 7,201,318 B2 | 4/2007 | Craen et al. | |
| 7,264,162 B2* | 9/2007 | Barkan | 235/454 |
| 2002/0050518 A1 | 5/2002 | Roustaei | |
| 2007/0080280 A1 | 4/2007 | Havens | |
| 2008/0296385 A1* | 12/2008 | Vinogradov | 235/462.22 |
| 2009/0072037 A1* | 3/2009 | Good et al. | 235/462.35 |

OTHER PUBLICATIONS

International Search Report and the Written Opinion of the International Searching Authority for International Application PCT/US2008/086193 mailed Feb. 6, 2009.

* cited by examiner

Primary Examiner — Edwyn Labaze

(57) ABSTRACT

An imaging assembly in an imaging reader for electro-optically reading indicia includes a solid-state imager having an array of image sensors, and a focus control element, such as a liquid imaging lens, having a variable transfer function characteristics for capturing, optically modifying and directing return light from the indicia over a field of view onto the imager for processing into an electrical signal indicative of the indicia during a reading mode of operation; and a controller for controlling the imaging assembly to optically modify the return light in accordance with a known transfer function stored in a memory accessible to the controller during a calibration mode of operation prior to the reading mode.

26 Claims, 3 Drawing Sheets

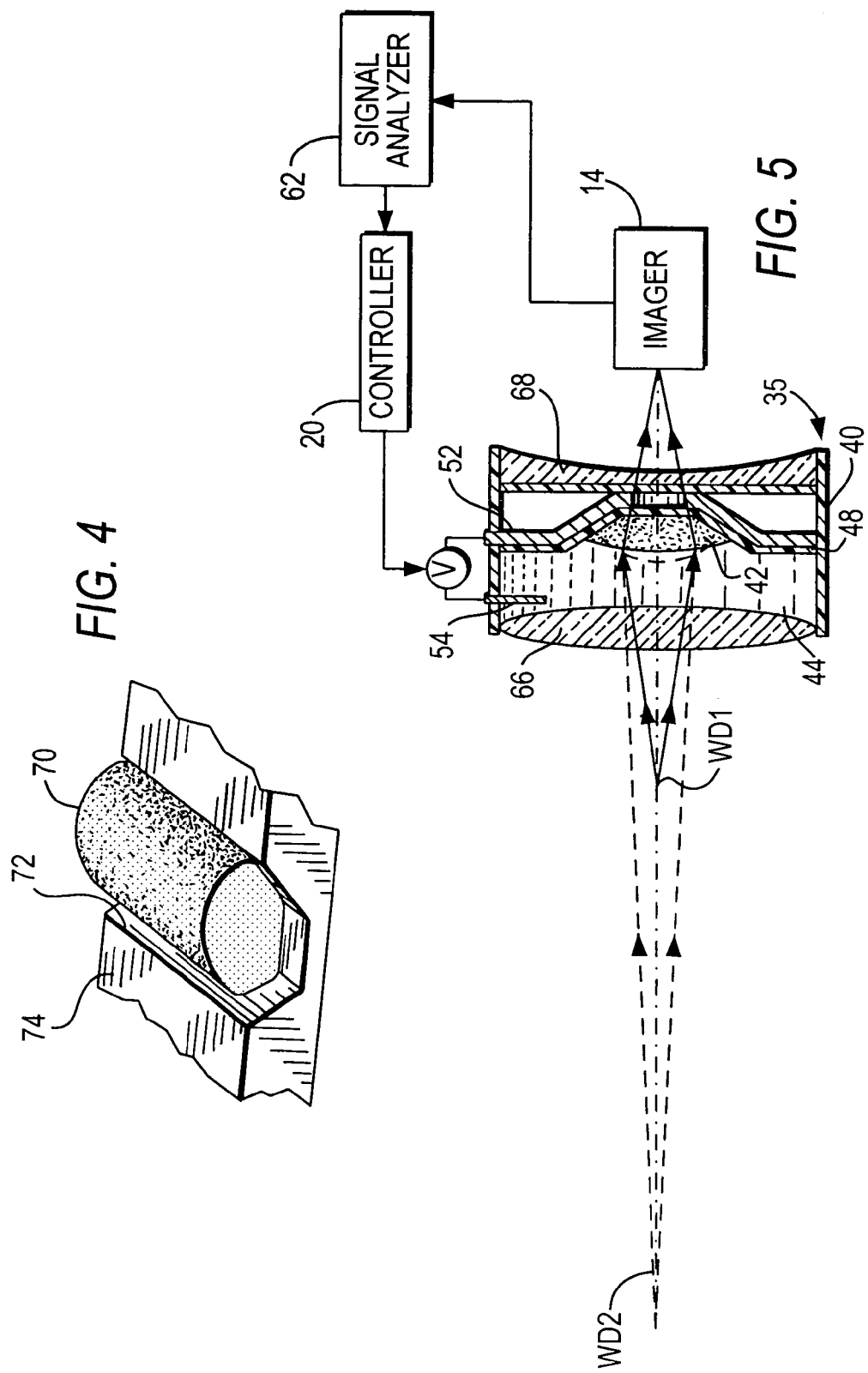

IMAGING READER WITH ADAPTIVE FOCUSING FOR ELECTRO-OPTICALLY READING SYMBOLS

DESCRIPTION OF THE RELATED ART

Solid-state imaging systems or imaging readers have been used to electro-optically read one-dimensional bar code symbols, particularly of the Universal Product Code (UPC) type, each having a row of bars and spaces spaced apart along one direction, and two-dimensional symbols, such as Code 49, which introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786.

The imaging reader includes a solid-state imager or sensor having an array of cells or photosensors, which correspond to image elements or pixels in a field of view of the imager, and an imaging lens assembly for capturing return light scattered and/or reflected from the symbol being imaged. Such an imager may include a one- or two-dimensional charge coupled device (CCD) or a complementary metal oxide semiconductor (CMOS) device and associated circuits for producing electronic signals corresponding to a one- or two-dimensional array of pixel information over the field of view.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

It is desirable that the symbol be capable of being read over an extended range of working distances relative to the imaging reader. It is conventional to move one or more lenses in the imaging lens assembly and, in turn, to move imaging planes at which the symbol is located between a near position close to the reader and a far position further away from the reader. The lens movement is typically performed mechanically. This is disadvantageous for several reasons. First, the mechanical movement generates vibrations that are propagated through the reader to a user's hand in a handheld mode of operation, and may also generate dust to obscure the imaging lens assembly. Moreover, the vibrations can generate objectionable, annoying, audible hum. In addition, the lens movement requires a drive that, in turn, consumes electrical power, is expensive and slow, can be unreliable, occupies space and increases the overall weight, size and complexity of the reader.

To avoid such mechanical movement, a liquid lens has been proposed to adjust the focus of an optical assembly. U.S. Pat. No. 5,305,731 describes a liquid lens with an adjustable focal length. U.S. Pat. No. 5,625,496 describes changing an index of refraction inside a liquid lens. French Patent Publication No. 2,791,439 and No. 2,769,375 (and its equivalent, U.S. Pat. No. 6,369,954) describe a variable focus liquid lens. A liquid lens based on an electro-wetting effect for use in electro-optical readers including imaging readers is described in U.S. Pat. No. 7,201,318 and U.S. Pat. No. 7,264,162 in which an electrical voltage is applied to the liquid lens to change an optical property, e.g., a focal length, thereof in accordance with a transfer function that resembles a parabola when a reciprocal of focal length is plotted against the applied voltage.

The liquid lens, however, has an unpredictable, nonlinear, curved transfer function and, in practice, exhibits a hysteresis property, in which the transfer function for increasing applied voltages is different from the transfer function for decreasing applied voltages. Also, the transfer function is distorted by ambient temperature, in that the transfer function at colder temperatures is different from that at warmer temperatures. A well-defined transfer function for the imaging lens assembly is desirable to reliably and accurately optically modify and image the return light in a known, predictable manner.

SUMMARY OF THE INVENTION

One feature of the present invention resides, briefly stated, in an arrangement for, and a method of, electro-optically reading indicia, e.g., one- and/or two-dimensional symbols and non-symbols, on a target, such as a product label. The arrangement includes an imaging assembly having a solid-state imager that has an array of image sensors, e.g., a CCD or a CMOS array, and a focus control element having variable transfer function characteristics, and operative for capturing, optically modifying and directing return light from the indicia over a field of view onto the imager for processing into an electrical signal indicative of the indicia during a reading mode of operation. The arrangement further includes a controller for controlling the imaging assembly to optically modify the return light in accordance with a known transfer function stored in a memory accessible to the controller during a calibration mode of operation prior to the reading mode.

In a preferred embodiment, the focus control element is a liquid imaging lens having a pair of light-transmissive liquids arranged along an optical path. The liquids are immiscible, have different optical indices of refraction, and have a substantially same density. One of the liquids has a shape in a rest state for optically modifying the return light passing through the one liquid along the optical path from the indicia with a first optical characteristic. The controller is operative for applying a voltage across the one liquid to change the shape thereof for optically modifying the return light to have a different, second optical characteristic.

The liquid imaging lens has an unconfined well in which the one liquid is accommodated in symmetrical relation relative to the optical path, the unconfined well having an open side. The controller is operative for applying the voltage across the one liquid in the unconfined well by allowing the one liquid to move through the open side of the unconfined well. The liquid imaging lens preferably further has at least one fixed focal lens spaced apart from the liquids along the optical path.

In accordance with one aspect of this invention, the controller is operative for storing the transfer function in a look-up table in the memory during the calibration mode, and the look-up table stores voltages applied to the liquid imaging lens, each applied voltage being indicative of an optical property, such as focal length, of the imaging assembly. The controller, therefore, controls the liquid lens in a predictable manner, without the distortions introduced by hysteresis as in the prior art, in which the transfer function for increasing applied voltages is different from the transfer function for decreasing applied voltages.

In accordance with another aspect of this invention, a temperature sensor is provided for detecting a temperature of the liquid imaging lens, and the controller is operative for storing voltages corresponding to different temperature ranges, each voltage being indicative of an optical property, such as focal length, of the imaging assembly during the calibration mode. The temperature detected by the temperature sensor falls within one of the temperature ranges in the look-up table in the memory. The controller, therefore, controls the liquid lens in a predictable manner, without the distortions introduced by temperature as in the prior art, in which the transfer function at colder temperatures is different from that at warmer temperatures.

In accordance with still another aspect of this invention, a rangefinder is provided for determining a distance between the imager and the indicia. The controller is operative for controlling the imaging assembly as a function of the distance determined by the rangefinder. In yet another aspect, the imager is operative for determining a quality of focus of the indicia, and the controller is operative for controlling the imaging assembly as a function of the quality of the focus determined by the imager. An additional aspect resides in a motion sensor for detecting relative motion between the imaging assembly and the indicia. The controller is operative for controlling the imaging assembly as a function of the motion detected by the motion sensor. A mode sensor is advantageously provided for detecting when the arrangement is being operated in a handheld mode or in a handsfree mode. The controller is operative for controlling the imaging assembly as a function of the mode detected by the mode sensor.

In the preferred embodiment, the controller is operative for periodically updating the transfer function stored in the memory during the reading mode, and the controller is operative for controlling the imaging assembly as a function of an updated transfer function. The controller is also operative for initially coarsely controlling the imaging assembly followed by finely controlling the imaging assembly.

The method of electro-optically reading the indicia comprises the steps of: capturing, optically modifying and directing the return light from the indicia over the field of view onto the solid-state imager having the array of image sensors, together with the focus control element having variable transfer function characteristics, by processing the return light into the electrical signal indicative of the indicia during the reading mode of operation; and controlling the imaging assembly to optically modify the return light in accordance with the known transfer function stored in the accessible memory during the calibration mode of operation prior to the reading mode.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a variant of a detail of the liquid imaging lens of FIG. 3;

FIG. 5 is a schematic diagram of the liquid imaging lens of FIG. 3 during capture of the return light in operation.

DETAILED DESCRIPTION OF THE PREFERRED EMBODIMENTS

Figure 1:
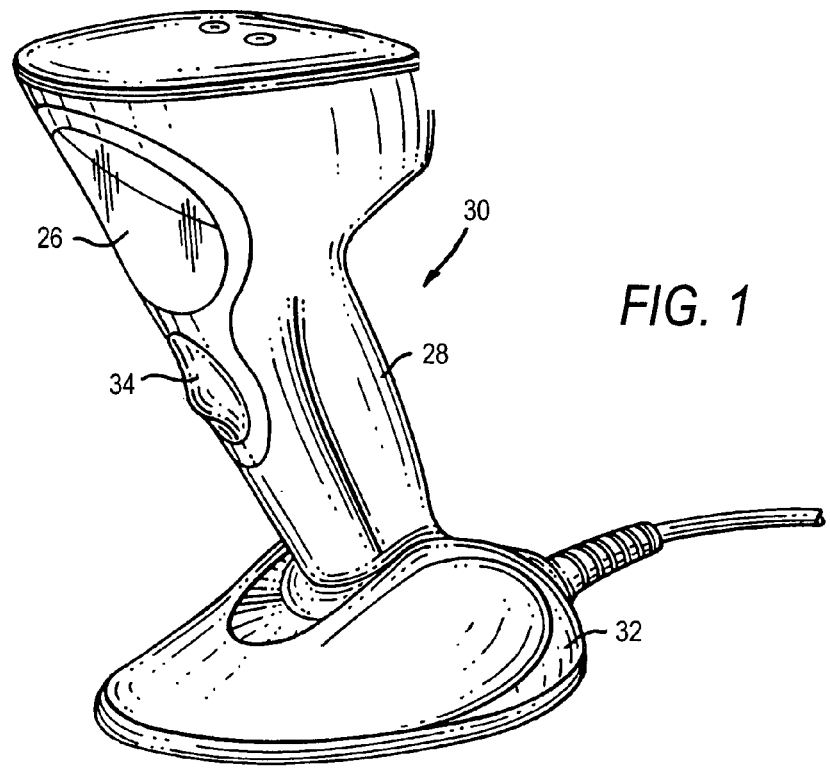
FIG. 1 is a perspective view of a portable imaging reader operative in either a handheld mode, or a hands-free mode, for capturing return light from indicia.

Reference numeral 30 in FIG. 1 generally identifies an imaging reader having a generally vertical window 26 and a gun-shaped housing 28 supported by a base 32 for supporting the imaging reader 30 on a countertop. The imaging reader 30 can thus be used in a hands-free mode as a stationary workstation in which products are slid, swiped past, or presented to, the vertical window 26, or can be picked up off the countertop and held in an operator's hand and used in a handheld mode in which a trigger 34 is manually depressed to initiate imaging of indicia to be read. In another variation, the base 32 can be omitted, and housings of other configurations can be employed.

Figure 2:
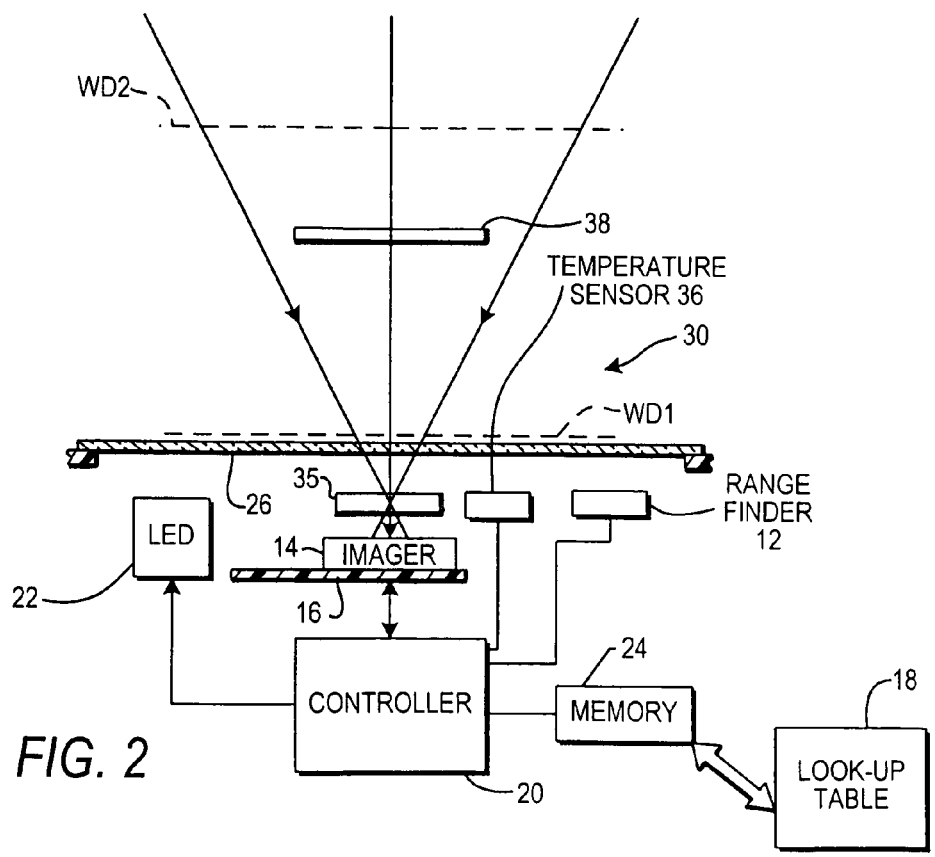
FIG. 2 is a schematic diagram of various components of the reader of FIG. 1.

As schematically shown in FIG. 2, an imager or sensor 14 is mounted on a printed circuit board 16 in the imaging system. The imager 14 is a solid-state device, for example, a CCD or a CMOS imager and has a one- or two-dimensional array of addressable image sensors operative for capturing return light captured and projected by an imaging lens assembly 35 through the window 26. The return light is scattered and/or reflected from a target 38, for example, a one- and/or two-dimensional symbol, or a non-symbol target, over a field of view. The non-symbol target can be virtually anything, such as a person, place, or thing whose picture is to be acquired. The targets are located anywhere in a working range of distances between a close-in working distance (WD1) and a far-out working distance (WD2). In a preferred embodiment, WD1 is about two inches from the imager array 14 and generally coincides with the window 26, and WD2 is about eight inches from the window 26.

An illuminator is also mounted in the imaging reader and preferably includes one light source, e.g., a light emitting diode (LED) 22, or a plurality of light sources arranged to uniformly illuminate the target. As shown in FIG. 2, the imager 14 and the illuminator LED 22 are operatively connected to a controller or microprocessor 20 operative for controlling the operation of these components. Preferably, the microprocessor is the same as the one used for processing the return light from the symbols and for decoding the captured target images.

In operation, the microprocessor 20 sends a command signal to pulse the illuminator LED 22 for a short time period, say 500 microseconds or less, and energizes and exposes the imager 14 to collect light from a target only during said time period. A typical array needs about 33 milliseconds to acquire the entire target image and operates at a frame rate of about 30 frames per second. The array may have on the order of one million addressable image sensors.

Figure 3:
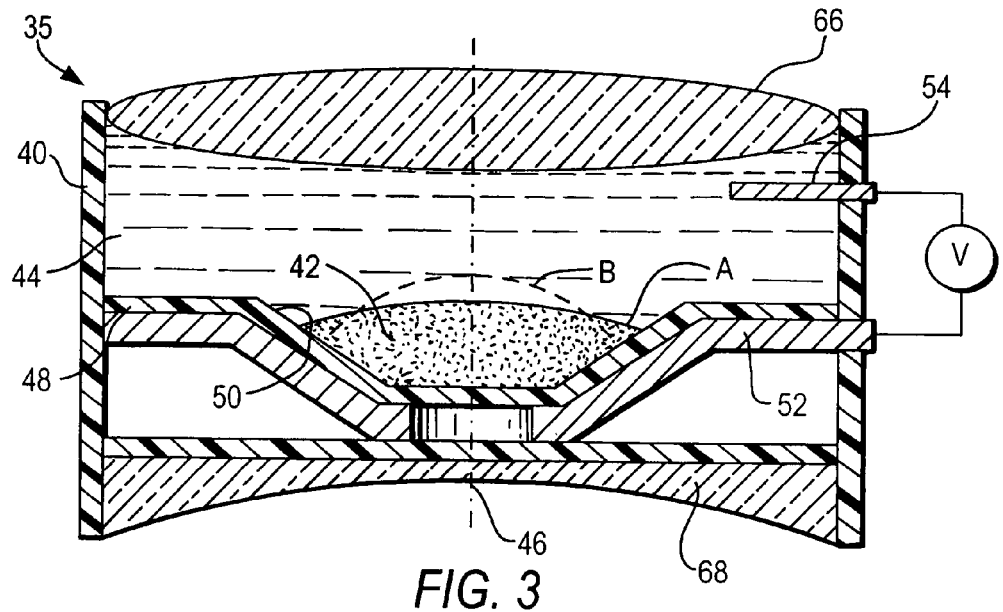
FIG. 3 is an enlarged, sectional view of a variable liquid imaging lens used in the reader of FIG. 1.

The imaging lens assembly 35 includes a focus control element, such as a voice coil or a variable liquid imaging lens as shown in FIG. 3. The liquid lens has a housing 40 in which a first liquid 42, shown in droplet form, and a second liquid 44 are arranged along an optical path 46 that, as described below in connection with FIG. 5, extends toward an indicia such as the indicia or symbol 38 to be read. The liquids 42, 44 are light-transmissive, immiscible, of different optical indices of refraction, and of a substantially same density. The liquid or drop 42 is constituted of an electrically insulating substance. For example, an oil, an alcane, or a blend of alcanes, preferably halogenated, or any other insulating liquid may be used for the drop 42. The liquid 44 is constituted of an electrically conductive substance, for example, water loaded with salts (mineral or other), or any other liquid, organic or not, and preferably made conductive by the addition of ionic components.

The housing 40 is constituted of an electrically insulating, light-transmissive, material, such as glass, preferably treated with silane or coated with a fluorinated polymer, or a laminate of fluorinated polymer, epoxy resin and polyethylene. The housing 40 includes a dielectric wall 48, preferably having a well 50 in which the drop 42 is accommodated in symmetrical relation relative to the optical path or axis 46. The wall 48 normally has a low wetting characteristic compared to the drop 42, but a surface treatment insures a high wetting characteristic and maintains a centered position of the drop 42 and prevents the drop from spreading. The well 50 further helps to prevent such spreading.

A first electrode 54 extends into the liquid 44, and a second electrode 52 is located below the wall 52. The electrodes are connected to a voltage source V. The electrodes, especially electrode 52, are preferably light-transmissive. When a voltage is applied across the electrodes, an electrical field is created which alters the wetting characteristic of the wall 48 with respect to the drop 42. The wetting increases substantially in the presence of an electrical field. With no voltage applied, the drop 42 may take the generally hemispherical shape in a rest state shown in solid lines in FIG. 3, and its outer surface "A" is convex or, in some cases, as described below, concave. When a voltage is applied, the wetting of the dielectric wall 48 increases, and the drop 42 deforms and takes the shape shown in dashed lines in FIG. 3, and its outer surface "B" is more convex with a smaller radius of curvature. This deformation of the drop changes the focus of the lens 35 and is employed to read the symbol 38 over a range of working distances, as described below in connection with FIG. 5.

By way of example, the drop 42 in the rest state has a diameter of about 6 mm. If the liquid 44 is salt water, its index of refraction is about 1.35. If the drop 42 is oil, its index of refraction is about 1.45. About 40 diopters of focus variation can be achieved for an applied voltage of about 40v RMS. The response time of the liquid lens is several hundredths of a second, in which case, if a periodic voltage is used, the frequency can be between 50 Hz and 10 kHz so that its period is smaller than the response time.

The voltage is preferably periodic, preferably a square wave drive voltage. The square wave is easily created with a variable duty cycle by the microprocessor 20 having a built-in pulse width modulator circuit. The drive voltage could also be sinusoidal or a triangular wave signal, in which case, the amplitude of the voltage controls the shape of the drop 42 and, in turn, the focal length and the working distance. When a square wave is used, focal length changes are achieved by varying the duty cycle or the drive voltage amplitude or both. When a sinusoidal wave is used, focal length changes are obtained by varying the drive voltage amplitude. The amplitude or the duty cycle can be changed in discrete steps (digital manner) or continuously (analog manner) by the microprocessor or controller 20. The voltage could also be a constant DC voltage.

FIG. 5 depicts the imager 14, preferably a CCD or CMOS array having mutually orthogonal rows and columns of photocells, together with the liquid lens 35 of FIG. 3 for imaging the symbol 38 located at, or anywhere between, the imaging planes WD1 and WD2, thereby providing the reader with an extended working range or depth of field in which to collect light from the symbol. The change in shape of the drop 42 when a voltage is applied to the liquid lens 35 enables the extended depth of field to be achieved. The controller 20 may operate to apply the voltage to the liquid lens 35 at all times, or at selected times. Thus, the voltage can be applied for each read, or for every other read, etc. The voltage can be applied not only during reading, but even afterward. The voltage can be initiated at the pull of the trigger 34, or only after a symbol has been detected. The voltage can be applied automatically, or only after a signal analyzer 62, preferably another microprocessor, has determined that the symbol has not yet been successfully decoded and read.

As described so far, the change in curvature of the drop 42 is between two convex curvatures A, B. It is also within the spirit of this invention to deform the drop 42 between different curvatures. For example, it is possible that the outer surface of the drop could be a meniscus, that is concave in the rest state, generally flat to focus the light at a first focal plane when a first voltage is applied, and convex to focus the light at a second focal plane when a second, different voltage is applied.

Referring again to FIG. 3, the liquid lens 35 may also have a fixed convex lens 66 at one axial end region, and a fixed concave, or plano-concave, lens 68 at the opposite axial end region. These fixed lenses are part of the overall optical assembly and assist in minimizing any kind of aberrations, for example, chromatic aberrations. The optical system should advantageously include an aperture stop (not illustrated) which can be positioned anywhere in the optical path. The lenses 66, 68 could also be eliminated and replaced by light-transmissive panels or windows.

In a variant, the drop 42 need not have a generally hemispherical shape, that is, radially symmetrical relative to the optical path 46, but could, as shown in FIG. 4, be elongated along a transverse direction generally perpendicular to the optical path. The cylindrical drop, now identified by reference numeral 70, rests in a channel-shaped well 72 formed by a dielectric wall 74. Upon application of a voltage, the cylindrical drop 70 now acts as a cylindrical lens.

It will be seen that the change in focus is accomplished without mechanical motion of any solid lenses. Except for the liquids, all parts of the variable liquid lens 35 can be made of molded materials. However, as noted above, the liquid lens has an unpredictable, nonlinear, curved transfer function characteristic and exhibits a hysteresis property, in which the transfer function for increasing applied voltages is different from the transfer function for decreasing applied voltages. Also, the transfer function is distorted by ambient temperature, in that the transfer function at colder temperatures is different from that at warmer temperatures.

In accordance with one aspect of this invention, the transfer function for the imaging lens assembly is made well-defined in order to reliably and accurately optically modify the return light in a known, predictable manner. More particularly, the controller 20 is operative for controlling the imaging assembly to optically modify the return light in accordance with a known transfer function stored in a memory 24 accessible to the controller 20 during a calibration mode of operation prior to the reading mode. The controller 20 is operative for storing the known transfer function in a shadow memory or look-up table 18 in the memory 24 during the calibration mode, and the look-up table 18 stores voltages applied to the liquid lens, each voltage being indicative of an optical property, such as focal length, of the imaging assembly as a function of both increasing and decreasing voltages applied to the liquid imaging lens 35. The storing of such data in the look-up table 18 is preferably performed in a factory or prior to first use of the reader The controller 20, therefore, controls the liquid lens 35 in a predictable manner, without the distortions introduced by hysteresis as in the prior art, in which the transfer function for increasing applied voltages is different from the transfer function for decreasing applied voltages.

In accordance with another aspect of this invention, a temperature sensor 36 is provided for detecting a temperature of the liquid imaging lens 35, and the controller 20 is operative for storing voltages corresponding to different temperature ranges, e.g., cold, warm and hot, each voltage being indicative of an optical property, such as focal length, of the imaging assembly during the calibration mode. The temperature detected by the temperature sensor 36 falls within one of the temperature ranges in the look-up table 18 in the memory 24. The controller 20, therefore, controls the liquid lens 35 in a predictable manner, without the distortions introduced by temperature as in the prior art, in which the transfer function at colder temperatures is different from that at warmer temperatures.

In accordance with still another aspect of this invention, a rangefinder 12 is provided for determining a distance between the imager 14 and the indicia 38. The rangefinder can transmit an acoustic or optical signal to the indicia, and receive an echo signal to determine the distance. The controller 20 is operative for controlling the imaging assembly as a function of the distance determined by the rangefinder 12. In yet another aspect, the imager 14 is operative, together with the signal analyzer 62, for determining a quality of focus of the indicia 38, and the controller 20 is operative for controlling the imaging assembly as a function of the quality of the focus determined by the imager.

Figure 6:
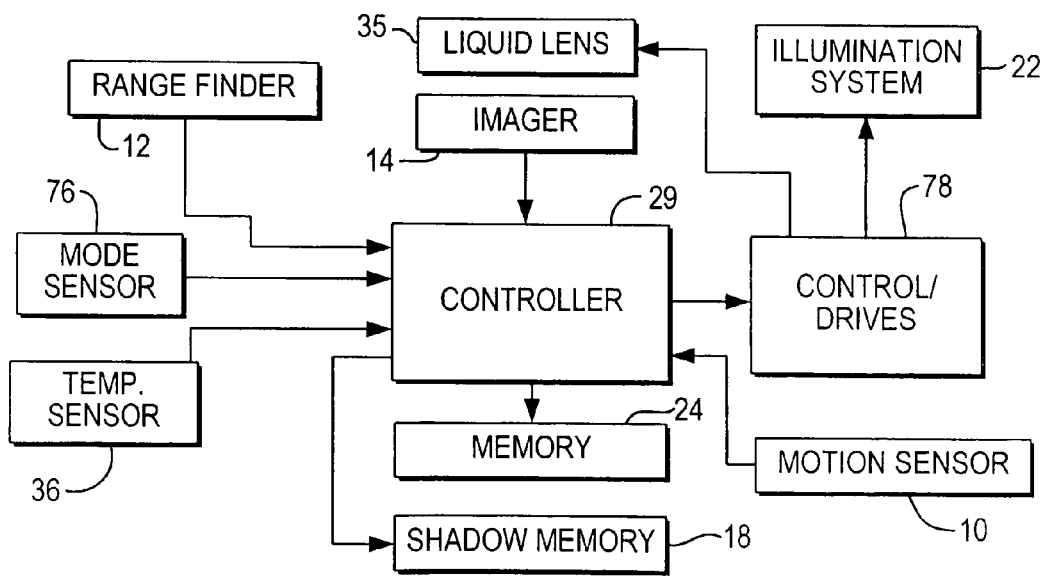
FIG. 6 is a block diagram of various components of the reader of FIG. 1.

An additional aspect resides, as shown in FIG. 6, in a motion sensor 10 for detecting relative motion between the imaging assembly and the indicia 38. The motion sensor 10 can advantageously include an accelerometer. The controller 20 is operative for controlling the imaging assembly as a function of the motion detected by the motion sensor 10.

A mode sensor 76 is advantageously provided for detecting when the arrangement is being operated in a handheld mode or in a handsfree mode. The mode sensor 76 can advantageously be a switch on the underside of the base 32 of the reader. When the reader is placed on the countertop or like support surface, the switch is actuated to signal the controller 20 that the reader is in a hands-free mode. Magnetic or pressure switches can also be used, especially when the reader is placed in a cradle or like stand. The controller 20 is operative for controlling the imaging assembly as a function of the mode detected by the mode sensor 76.

In the preferred embodiment, the controller 20 is operative for periodically updating the transfer function stored in the memory 24 during the reading mode; and the controller 20 is operative for controlling the imaging assembly as a function of an updated transfer function. The controller 20 is also operative for initially coarsely controlling the imaging assembly in large increments, followed by finely controlling the imaging assembly in smaller increments.

The temperature sensor 36 is operative not only to predict the transfer function of the liquid lens 35 at different temperatures, but is also used to modify the attack in driving the liquid lens. For example, when the temperature sensor 36 indicates that the ambient temperature is cold, then the controller 20 conducts a control signal to a drive 78, as shown in FIG. 6, to drive the liquid lens 35 harder. The temperature sensor 36 can also be used to reduce power consumption to improve the working lifetime of the illumination light source 22.

The motion sensor 10 is operative for changing the behavior of the imaging reader based on relative motion between the reader and the indicia. For example, if the indicia 38 is moving, then the controller 20, upon receiving a motion signal from the motion sensor 10 is operative for reducing the exposure time of the imager 14 and for increasing the illumination by the illumination light source 22. When movement stops, the illumination can be turned off to save power. Rather than using the motion sensor 10, the imager 14 can be used to sense motion, in which case the illumination system 22 can be driven in a flash mode as a shuttering mechanism.

In the hands-free mode, the imager 14 can be operated to continuously calibrate the imaging lens assembly based on indicia 38 in the field of view. For example, the indicia can be a target on the countertop, or on a support structure for the imager. The controller 20 preferably periodically retraces the hysteresis curve to improve the calibration data immediately following a reading session. Learning algorithms are used to help predict the transfer function during the next reading session based on a history of use of the reader.

Rapid, large adjustments are used for coarse changes, followed by slow, fine adjustments when needed. Larger focusing errors in targeting a symbol can be tolerated as compared to taking a picture. A focus position can be held after a decode, in which case power is removed from other system elements. The focus position is held in anticipation of the next pull of the trigger 34.

To further aid focusing, the illumination system 22 is focused on a small region of the indicia 38. An aiming laser, or a single LED 22, can be used for this purpose. The trigger 34 can be provided with a first position for aiming, and with a second position for reading. An ambient light detector can also be used to prevent the illumination system 22 from being actuated when there is sufficient light.

It will be understood that each of the elements described above, or two or more together, also may find a useful application in other types of constructions differing from the types described above.

While the invention has been illustrated and described as an imaging reader with adaptive focusing for electro-optically reading indicia, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for electro-optically reading indicia, comprising:
   an imaging assembly including a solid-state imager having an array of image sensors, and a focus control element having a variable transfer function characteristic for capturing, optically modifying and directing return light from the indicia over a field of view onto the imager for processing into an electrical signal indicative of the indicia during a reading mode of operation; and
   a controller for controlling the imaging assembly to optically modify the return light in accordance with a known transfer function stored in a memory accessible to the controller during a calibration mode of operation prior to the reading mode, wherein the known transfer function defines an optical property of the imaging assembly as a function of a voltage applied to the focus control element.

2. The arrangement of claim 1, wherein the focus control element is a liquid imaging lens having a pair of light-transmissive liquids arranged along an optical path, the liquids being immiscible, of different optical indices of refraction, and of a substantially same density, one of the liquids having a shape in a rest state for optically modifying the return light passing through said one liquid along the optical path from the indicia with a first optical characteristic; and wherein the controller is operative for applying a voltage across said one liquid to change the shape thereof for optically modifying the return light to have a different, second optical characteristic.

3. The arrangement of claim 2, wherein the liquid imaging lens has an unconfined well in which said one liquid is accommodated in symmetrical relation relative to the optical path, the unconfined well having an open side; and wherein the controller is operative for applying the voltage across said one liquid in the unconfined well by allowing said one liquid to move through the open side of the unconfined well.

4. The arrangement of claim 3, wherein the liquid imaging lens further has at least one fixed focal lens spaced apart from the liquids along the optical path.

5. The arrangement of claim 1, wherein the controller is operative for storing the known transfer function in a look-up table in the memory during the calibration mode, and wherein the look-up table stores voltages indicative of different optical properties of the imaging assembly as a function of both increasing and decreasing voltages applied to the focus control element.

6. The arrangement of claim 5, and a temperature sensor for detecting a temperature of the focus control element; and wherein the controller is operative for storing voltages indicative of different optical properties of the imaging assembly at different temperature ranges in the look-up table in the memory during the calibration mode.

7. The arrangement of claim 1, and a rangefinder for determining a distance between the imager and the indicia; and wherein the controller is operative for controlling the imaging assembly as a function of the distance determined by the rangefinder.

8. The arrangement of claim 1, and wherein the imager is operative for determining a quality of focus of the indicia; and wherein the controller is operative for controlling the imaging assembly as a function of the quality of the focus determined by the imager.

9. The arrangement of claim 1, and a motion sensor for detecting relative motion between the imaging assembly and the indicia; and wherein the controller is operative for controlling the imaging assembly as a function of the motion detected by the motion sensor.

10. The arrangement of claim 1, and a mode sensor for detecting when the arrangement is being operated in one of a handheld mode and a handsfree mode; and wherein the controller is operative for controlling the imaging assembly as a function of the mode detected by the mode sensor.

11. The arrangement of claim 1, wherein the controller is operative for periodically updating the transfer function stored in the memory during the reading mode; and wherein the controller is operative for controlling the imaging assembly as a function of an updated transfer function.

12. The arrangement of claim 1, wherein the controller is operative for initially coarsely controlling the imaging assembly followed by finely controlling the imaging assembly.

13. The arrangement of claim 1, wherein the focus control element is a liquid imaging lens.

14. An arrangement for electro-optically reading indicia, comprising:

imaging means having a variable transfer function characteristic for capturing and optically modifying return light from the indicia over a field of view, and for processing the return light into an electrical signal indicative of the indicia during a reading mode of operation; and means for controlling the imaging means to optically modify the return light in accordance with a known transfer function stored in accessible means during a calibration mode of operation prior to the reading mode, wherein the known transfer function defines an optical property of the imaging means as a function of a voltage applied to the imaging means.

15. A method of electro-optically reading indicia, comprising the steps of: capturing, optically modifying and directing return light from the indicia over a field of view onto a solid-state imager having an array of image sensors with an imaging assembly having a focus control element with a variable transfer function characteristic by processing the return light into an electrical signal indicative of the indicia during a reading mode of operation; and controlling the imaging assembly to optically modify the return light in accordance with a known transfer function stored in an accessible memory during a calibration mode of operation prior to the reading mode, wherein the known transfer function defines an optical property of the imaging assembly as a function of a voltage applied to the focus control element.

16. The method of claim 15, and arranging a pair of light-transmissive liquids along an optical path, and configuring the liquids to be immiscible, of different optical indices of refraction, and of a substantially same density, and optically modifying the return light passing through one of the liquids along the optical path from the indicia with a first optical characteristic; and applying a voltage across said one liquid to change a shape thereof in a rest state to optically modify the return light to have a different, second optical characteristic.

17. The method of claim 16, and accommodating said one liquid in an unconfined well in the liquid imaging lens in symmetrical relation relative to the optical path, and configuring the unconfined well to have an open side; and applying the voltage across said one liquid in the unconfined well by allowing said one liquid to move through the open side of the unconfined well.

18. The method of claim 17, and spacing at least one fixed focal lens apart from the liquids along the optical path.

19. The method of claim 15, and storing the known transfer function in a look-up table in the memory during the calibration mode, and storing voltages indicative of different optical properties of the imaging assembly as a function of both increasing and decreasing voltages applied to the focus control element.

20. The method of claim 19, and detecting a temperature of the focus control element; and storing voltages indicative of different optical properties of the imaging assembly at different temperature ranges in the look-up table in the memory during the calibration mode.

21. The method of claim 15, and determining a distance between the imager and the indicia; and controlling the imaging assembly as a function of the distance determined.

22. The method of claim 15, and determining a quality of focus of the indicia; and controlling the imaging assembly as a function of the quality of the focus determined.

23. The method of claim 15, and detecting relative motion between the imaging assembly and the indicia; and controlling the imaging assembly as a function of the motion detected.

24. The method of claim 15, and detecting when the imaging assembly is being operated in one of a handheld mode and a handsfree mode; and controlling the imaging assembly as a function of the mode detected.

25. The method of claim 15, and periodically updating the transfer function stored in the memory during the reading mode; and controlling the imaging assembly as a function of an updated transfer function.

26. The method of claim 15, and initially coarsely controlling the imaging assembly followed by finely controlling the imaging assembly.

* * * * *